Nov. 17, 1970     W. SCHLÜTER     3,540,299

ROTARY MOUNT

Filed Oct. 9, 1968

INVENTOR
Wilhelm SCHLÜTER

BY
his ATTORNEY

United States Patent Office 3,540,299
Patented Nov. 17, 1970

3,540,299
ROTARY MOUNT
Wilhelm Schlüter, Dortmund-Gartenstadt, Germany, assignor to Eisenwerk Rothe Erde GmbH, Dortmund, Germany
Filed Oct. 9, 1968, Ser. No. 766,179
Claims priority, application Germany, June 25, 1968, 1,756,669
Int. Cl. F16h 27/04
U.S. Cl. 74—129
3 Claims

ABSTRACT OF THE DISCLOSURE

The outer race of an antifriction bearing in a crane or excavator is rotated with reference to the inner race by a pair of brake bands which are applied around the outer race and have their ends connected to pairs of levers which are pivotable with reference to each other by double-acting cylinder and piston assemblies to thereby tighten or loosen the respective bands. Two double-acting cylinder and piston units are pivotable about axes which are parallel to the axis of the outer race and have piston rods which are coupled to the pivots for the levers so that when a piston rod performs a stroke while the corresponding band is tightened around the outer race, the latter is rotated in a clockwise or in a counterclockwise direction.

BACKGROUND OF THE INVENTION

The present invention relates to improvements in structures (hereinafter called mounts or rotary mounts) wherein a driven member is caused to rotate with reference to a supporting member which may, but need not be stationary. More particularly, the invention relates to improvements in mounts wherein a supporting member which preferably constitutes the inner race of an oversized antifriction bearing carries a driven member or rotary member which constitutes the outer race of such bearing and rotates on the supporting member through the intermediary of one or more annuli of balls, rollers or analogous antifriction rolling elements. The mount of the present invention can be utilized, among others, in cranes, excavators, dredgers, steam shovels and other heavy-duty earth-moving or construction equipment wherein a turret, a boom, a shovel, a column or a like part rotates with reference to a stationary or wheel-mounted supporting part.

It is already known to rotate the rotary part of a crane or the like by means of a large gear which is mounted on the rotary part and meshes with a pinion which is driven by a reversible hydraulic motor so that the rotary part can turn in a clockwise or in a counter-clockwise direction, depending on the direction of operation of the hydraulic motor. It is also known to drive such rotary part by resorting to a hydrostatic drive which employs at least three double-acting hydraulic cylinders and automatic means for changing the direction of fluid flow to and from such cylinders. The cylinders are mounted for rotary movement about an axis which is parallel to the axis of the rotary part. A drawback of such known drives is that they occupy too much room, particularly in the region around the axis of the rotary part, so that there is no space left for cables, conductors, columns, conduits and/or the like.

SUMMARY OF THE INVENTION

One of the objects of my invention is to provide a simple, compact and rugged rotary mount wherein the rotary part can be driven by fluid-operated devices and in such a way that all such devices can be installed in the area around the rotary part.

Another object of the invention is to provide a rotary mount wherein the parts of the drive are accessible at all times, wherein such parts can be operated to drive the rotary part in either direction, to drive the rotary part continuously or intermittently, to suddenly or gradually arrest the rotary part and/or to perform any desired combination of such operations.

A further object of the invention is to provide a drive which does not employ gears, pinions, racks or analogous toothed parts which are heavy, bulky and undergo considerable wear.

An additional object of the invention is to provide a rotary mount wherein the entire area within the confines of the rotary part is available for mounting of parts and/or for passage of conduits, conductors, pipes, cables or the like.

The improved rotary mount comprises a support which can constitute the inner race of a large antifriction bearing in a crane or the like, a driven member which may constitute the outer race of such bearing and is rotatable on one or more annuli of rolling elements disposed between the two races, torque transmitting means including one or more brake bands which are applied around the outer race and preferably extend into circumferential grooves machined into the peripheral surface of the outer race, and fluid-operated cylinder and piston means for rotating the driven member by way of the brake bands. The arrangement is preferably such that the ends of brake bands are coupled to the respective piston rods by pairs of levers each having a first arm connected to one end of the respective band and each having a second arm which can be pivoted by a double-acting fluid-operated cylinder and piston assembly to thereby loosen or tighten the respective brake band around the outer race. The pairs of levers have common pivots provided on the corresponding piston rods.

The piston rods can rotate the driven member while performing outward or return strokes and one of these piston rods can serve to brake the driven member while the other piston rod causes the driven member to rotate in a clockwise or in a counterclockwise direction. The piston rods can be mounted in such a way that one thereof pushes and the other pulls in order to rotate the driven member in a desired direction or that each thereof pushes or pulls in order to effect such rotary movement of the driven member. The operation of the piston rods and of the aforementioned tightening and loosening assemblies can be programmed so that the driven member can be rotated continuously and at a desired speed, depending on the speed of movement of the piston rods.

The novel features which are considered as characteristic of the invention are set forth in particular in the appended claims. The improved mount itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
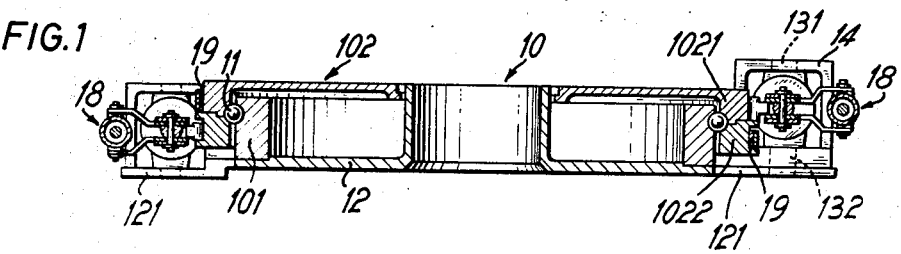
FIG. 1 is an axial sectional view of a rotary mount which embodies the invention, the section being taken in the direction of arrows as seen from the line I—I of FIG. 2.

The invention is embodied in a rotary mount which can be utilized in cranes, excavators and/or other machines wherein a driven part or a group of driven parts rotates or should rotate with reference to a stationary or mobile support. The mount 10 of FIGS. 1 to 3 comprises a stationary support 101 which constitutes the inner race of a large antifriction bearing and cooperates with a two-piece outer race 102 which constitutes the rotary or driven member of the mount 10. The two annular sections of the driven member 102 are shown at 1021 and 1022. At least one annulus of antifriction rolling elements (here shown as balls 11) is interposed between the two races. For example, the inner race or support 101 can be mounted on a disk-shaped platform 12 which is mounted on the wheels (not shown) of an excavating machine. The driven member or outer race 102 can constitute a turntable of the excavating machine and can carry a column, a shovel or another device or set of devices which form part of such machine.

The platform 12 has two plate-like extensions or holders 121 for two hydraulically operated double-acting cylinder and piston units 13. The arrangement is such that each unit 13 can pivot back and forth about an axis which is parallel to the common axis of the races 101, 102. To this end, the cylinders 113 of the two units 13 are provided with pairs of coaxial trunnions 131, 132 the latter of which are journalled directly in the respective holders 121. The upper trunnions 131 are journalled in inverted U-shaped brackets or yokes 14 whose ends are affixed to the respective holders 121.

The piston rods 15 of the units 13 are reciprocable with reference to the corresponding cylinders 113 between two end positions and through median or central positions in which they extend substantially tangentially of the outer race 102. The outer end portion 151 of each piston rod 15 has a vertical bore for a pivot pin 16 which forms part of a coupling between the respective unit 13 and one of two flexible torque-transmitting brake bands 19 which are applied around the peripheral surface of the outer race 102. The end portions of the bands 19 are connected to the shorter arms of bell crank levers 17 which are fulcrumed on the respective pivot pins 16 and whose longer arms are connected with double-acting hydraulic cylinder and piston assemblies 18. The purpose of the assemblies 18 is to either apply the liners of brake bands 19 or to disengage such liners from the peripheral surface of the outer race 102. Each assembly 18 comprises a cylinder 118 which is articulately coupled to the longer arm of one of the corresponding levers 17 and a piston rod 181 which is articulately coupled to the longer arm of the other lever 17. When a piston rod 181 is expelled from the corresponding cylinder 118, the respective band 19 is tightened around the outer race 102 and the corresponding unit 13 is then in a position to rotate the outer race in response to movement of the piston rod 15 with reference to its cylinder 113.

Figure 3:
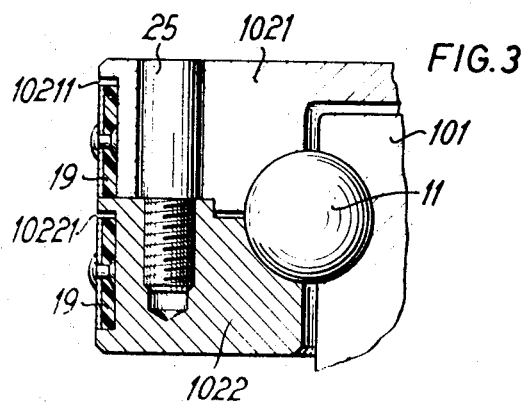
FIG. 3 is an enlarged fragmentary vertical sectional view as seen in the direction of arrows from the line III—III of FIG. 2.

As shown in FIG. 3, the sections 1021, 1022 of the outer race 102 are respectively provided with external circumferential grooves or recesses 10211 and 10221 each of which accommodates one of the brake bands 19. Thus, each band 19 is readily accessible for inspection and/or replacement. The material of brake bands 19 is similar to or identical with the material which is employed for the manufacture of brake bands in automotive vehicles or the like, and the same applies for the liners which are provided at the inner sides of such bands to come into direct engagement with the peripheral surfaces of the sections 1021, 1022. These sections are separably affixed to each other by bolts 25 or analogous fasteners.

Figure 2:
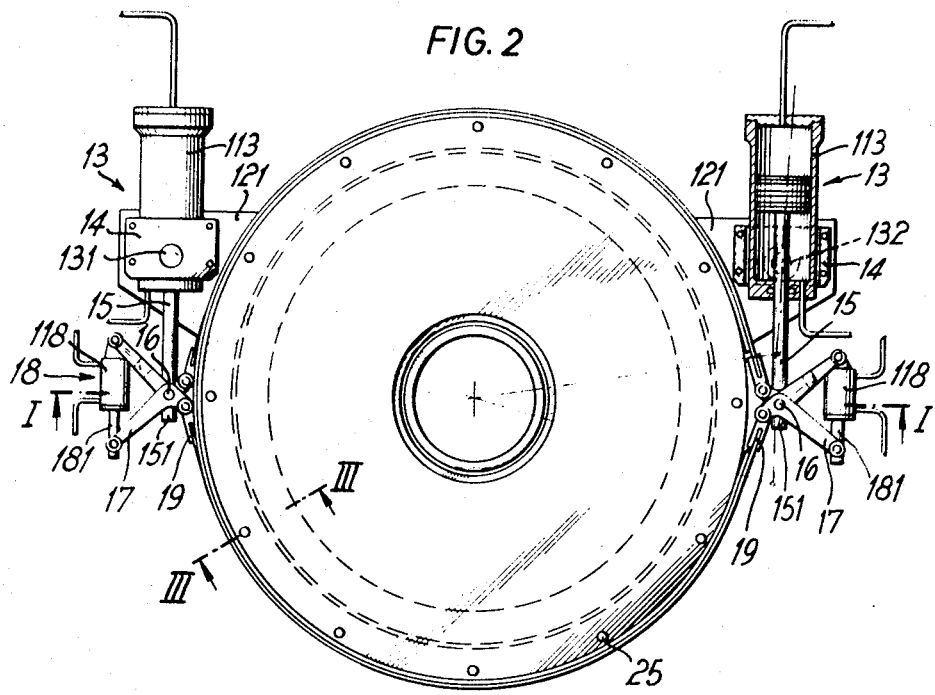
FIG. 2 is a top plan view of the rotary mount, with one of the cylinder and piston units shown in axial section.

The operation:

FIGS. 1 and 2 show a rotary mount wherein the piston rods 15 of both cylinders 113 extend in the same direction, i.e., downwardly, as viewed in FIG. 2. Therefore, and when the operator wishes to rotate the outer race 102 in a given direction, for example, in a clockwise direction as viewed in FIG. 2, the piston rod 15 of the right-hand unit 13 will push and the piston rod 15 of the left-hand unit 13 will pull the respective coupling pin 16. When the end portion 151 of the right-hand piston rod 15 pushes the associated pin 16, the right-hand cylinder and piston assembly 18 causes the corresponding levers 17 to maintain the respective brake band 19 in strong frictional engagement with the outer race 102 so that the latter rotates in response to downward movement of the right-hand piston rod 15 (reference being had to FIG. 2). At the same time, the left-hand assembly 18 allows the corresponding brake band 19 to slide with reference to the outer race 102 so that the left-hand piston rod 15 can be moved to extended position and is ready to pull the corresponding pin 16 upwardly even before the right-hand piston rod 15 completes its downward stroke. The left-hand assembly 18 tightens the corresponding brake band 19 when the right-hand assembly 18 loosens the respective band 19 so that the outer race 102 can be rotated continuously as long as at least one of the piston rods 15 is operatively connected with the associated band 19 by way of the corresponding coupling means 17, 16 and in the operative position of the corresponding cylinder and piston assembly 18. The units 13 and the assemblies 18 are preferably operated with a liquid pressure medium, for example, with oil.

If the outer race 102 is to rotate in a counterclockwise direction, as viewed in FIG. 2, the right-hand assembly 18 is operative when the right-hand piston rod 15 moves upwardly and the left-hand assembly 18 is operative when the left-hand piston rod 15 moves downwardly. Intermittent indexing of the outer race 102 can be effected by operating one of both units 13.

If the position of one of the units 13 is changed by 180 degrees, for example, by turning the left-hand unit 13 of FIG. 2 in the plane of this illustration so that the corresponding piston rod 15 extends upwardly, the outer race 102 is rotated in a clockwise direction in response to a push by either piston rod 15 and in a counterclockwise direction in response to a pull by either piston rod 15. It is preferred to provide the apparatus with a suitable programming system which automatically regulates the flow of hydraulic pressure medium to and from the chambers of cylinders 113 and 118 so that one of the piston rods 15 can begin to turn the outer race 102 by way of the associated brake band 19 even before the other piston rod 15 completes its inward or outward stroke. This can be readily achieved by appropriate timing of admission and evacuation of pressure medium from the cylinders 118.

It is further clear that one of the units 13 can be used to rotate the outer race 102 in either direction while the other unit 13 serves to perform a braking action. For example, the right-hand unit 13 of FIG. 2 can be used to rotate the race 102 in a clockwise direction (in response to each downward stroke of the right-hand piston rod 15) and the left-hand piston rod 15 can be used to brake the race 102 as soon as the right-hand piston rod 15 completes its downward stroke or as soon as the right-hand assembly 18 loosens the corresponding brake band 19. The left-hand piston rod 15 can perform such braking action while being held against any movement with reference to the corresponding cylinder 113 or while it performs a downward stroke.

In normal operation, when both units 13 serve to rotate the race 102 in a given direction, the braking action can be performed by the assemblies 18. Thus, the outer race 102 is braked as soon as the piston rods 15 come to a halt and the assemblies 18 cause the corresponding levers 17 to apply the bands 19 to the sections 1021, 1022.

What is claimed as new and desired to be protected by Letters Patent is set forth in the appended claims:

1. In a structure of the character indicated, particularly in a rotary mount, a combination comprising a support; a driven member rotatably mounted on said support; torque transmitting means including at least one brake band encircling at least a portion of said driven member; fluid-operated cylinder and piston means for rotating said member by way of said band, said cylinder and piston means comprising at least one cylinder and piston unit having a first portion and a second portion reciprocable with reference to said first portion between two end positions and through a median position in which said second portion extends substantially tangentially of said driven member; and means for tightening and loosening said band so that the latter can rotate said driven member when applied tightly around the same, said tightening and loosening means comprising at least one fluid-operated double-acting cylinder and piston assembly.

2. In a structure of the character indicated, particularly in a rotary mount, a combination comprising a support constituted by the inner race of an antifriction bearing; a driven member constituted by the outer race of an antifriction bearing; an annulus of antifriction rolling elements between said races for rotatably mounting said driven member on said support; torque transmitting means including at least one brake band encircling at least a portion of said driven member; and fluid-operated cylinder and piston means for rotating said member by way of said band.

3. In a structure of the character indicated, particularly in a rotary mount, a combination comprising a support; a driven member rotatably mounted on said support; torque transmitting means comprising a pair of brake bands each encircling at least a portion of said driven member and each having two end portions; fluid-operated cylinder and piston means for rotating said member by way of said bands and comprising two double-acting cylinder and piston units each having a cylinder and a piston rod reciprocable with reference to said cylinder; coupling means connecting each of said piston rods with the ends of one of said brake bands and comprising a pivot provided on the respective piston rod and a pair of two-armed levers pivotable on such pivot and each having one of its arms connected to one end of the respective brake band; and means for tightening and loosening said brake bands with reference to said driven member so that said units can rotate the driven member by way of the respective piston rods when the corresponding bands are tightened around said driven member, said tightening and loosening means comprising double-acting cylinder and piston assemblies arranged to pivot the levers of said pairs with reference to each other.

References Cited

UNITED STATES PATENTS

| | | | |
|---|---|---|---|
| 1,452,349 | 4/1923 | Oberley et al. | 192—80 |
| 2,213,361 | 9/1940 | Cardwell | 192—80 |
| 2,947,187 | 8/1960 | Graff et al. | 74—128 |

WESLEY S. RATLIFF, JR., Primary Examiner